United States Patent
Huang et al.

(10) Patent No.: US 11,187,963 B2
(45) Date of Patent: Nov. 30, 2021

(54) SYSTEM AND METHOD FOR PROGRAMMABLE NONLINEAR SILICON PHOTONIC CIRCUIT

(71) Applicant: The Trustees of Princeton University, Princeton, NJ (US)

(72) Inventors: Chaoran Huang, Plainsboro, NJ (US); Thomas Ferreira De Lima, Princeton, NJ (US); Alexander Tait, Boulder, CO (US); Siamak Abbaslou, Kendall Park, NJ (US); Aashu Jha, Princeton, NJ (US); Bhavin Shastri, Lawrenceville, NJ (US); Paul R. Prucnal, Princeton, NJ (US); Mitchell A. Nahmias, Princeton, NJ (US); Hsuan-Tung Peng, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 136 days.

(21) Appl. No.: 16/775,746

(22) Filed: Jan. 29, 2020

(65) Prior Publication Data

US 2021/0278743 A1    Sep. 9, 2021

Related U.S. Application Data

(60) Provisional application No. 62/798,704, filed on Jan. 30, 2019.

(51) Int. Cl.
*G02F 1/35* (2006.01)
*G02F 1/365* (2006.01)

(52) U.S. Cl.
CPC ............ *G02F 1/3517* (2013.01); *G02F 1/365* (2013.01)

(58) Field of Classification Search
None
See application file for complete search history.

(56) References Cited

U.S. PATENT DOCUMENTS

| | | | |
|---|---|---|---|
| 6,529,674 B2* | 3/2003 | Fields | G02F 1/3515 385/140 |
| 8,014,676 B2* | 9/2011 | Chen | H04B 10/00 398/85 |
| 10,656,336 B1* | 5/2020 | Nahmias | G06E 3/005 |

(Continued)

OTHER PUBLICATIONS

C. Huang et al., "Programmable Silicon Photonic Optical Thresholder," in IEEE Photonics Technology Letters, vol. 31, No. 22, pp. 1834-1837, 15 Nov. 15, 2019, doi: 10.1109/LPT.2019.2948903. (Year: 2019).*

(Continued)

*Primary Examiner* — Rhonda S Peace
(74) *Attorney, Agent, or Firm* — Meagher Emanuel Laks Goldberg & Liao, LLP

(57) ABSTRACT

According to various embodiments, an all-optical thresholder device is disclosed. The all-optical thresholder device includes a Mach-Zehnder interferometer (MZI) coupled to a Mach-Zehnder coupler (MZC). The MZI includes at least one microring resonator (MRR) and a first tunable element, where the MRR further includes a second tunable element. The MZC includes a third tunable element. The first, second, and third tunable elements are configured to control biases of the all-optical thresholder device to achieve a desired power transfer function.

31 Claims, 16 Drawing Sheets

(56) References Cited

U.S. PATENT DOCUMENTS 10,670,860 B2 * 6/2020 Tait .................. G02B 27/0012
2017/0090267 A1 * 3/2017 O'Sullivan .......... H04B 10/516

OTHER PUBLICATIONS

A. N. Tait, M. A. Nahmias, M. P. Fok and P. R. Prucnal, "A dual resonator enhanced asymmetric Mach-Zehnder: Ultrafast passive thresholder for silicon-on-insulator," 2012 International Conference on Optical MEMS and Nanophotonics, 2012, pp. 212-213, doi: 10.1109/OMEMS.2012.6318878. (Year: 2012).*

N. Kawaguchi, et al., "Design for high speed operation of double microring resonator-loaded Mach-Zehnder 2x2 quantum well optical switch," 2016 21st OptoElectronics and Communications Conference (OECC) held jointly with 2016 International Conference on Photonics in Switching (PS), 2016, pp. 1-3. (Year: 2016).*

Tait, Alexander N., et al. "The DREAM: an integrated photonic thresholder." Journal of Lightwave Technology, vol. 31, vol. 8, pp. 1263-1272, Apr. 15, 2013.

* cited by examiner

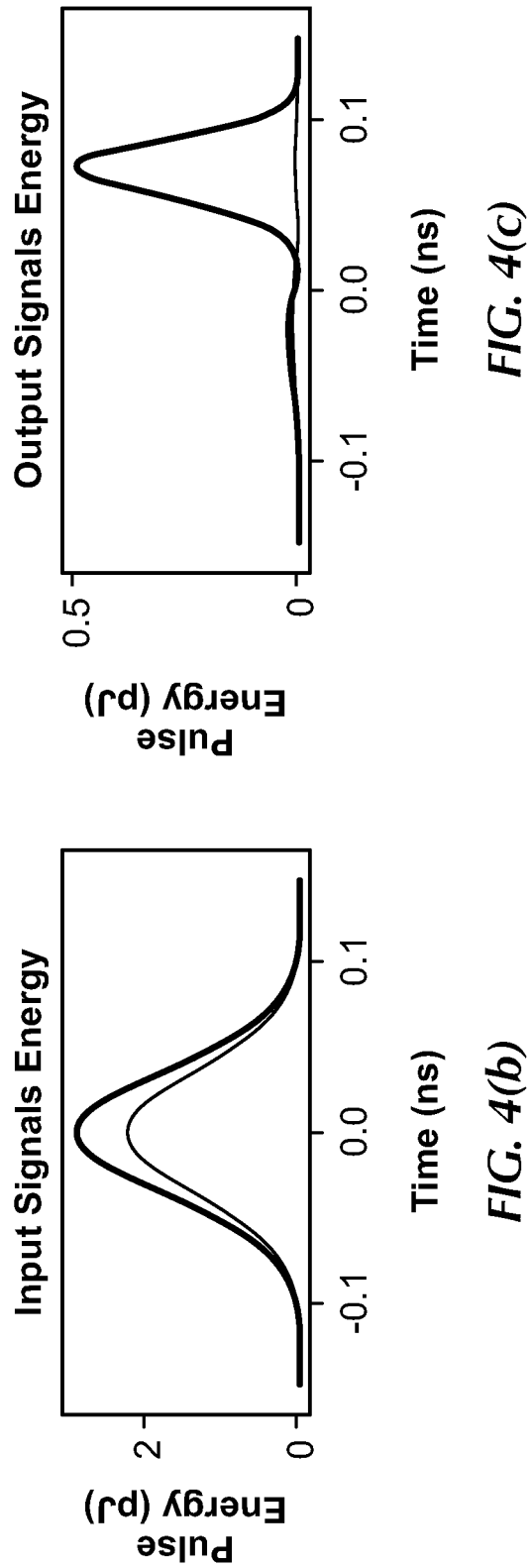
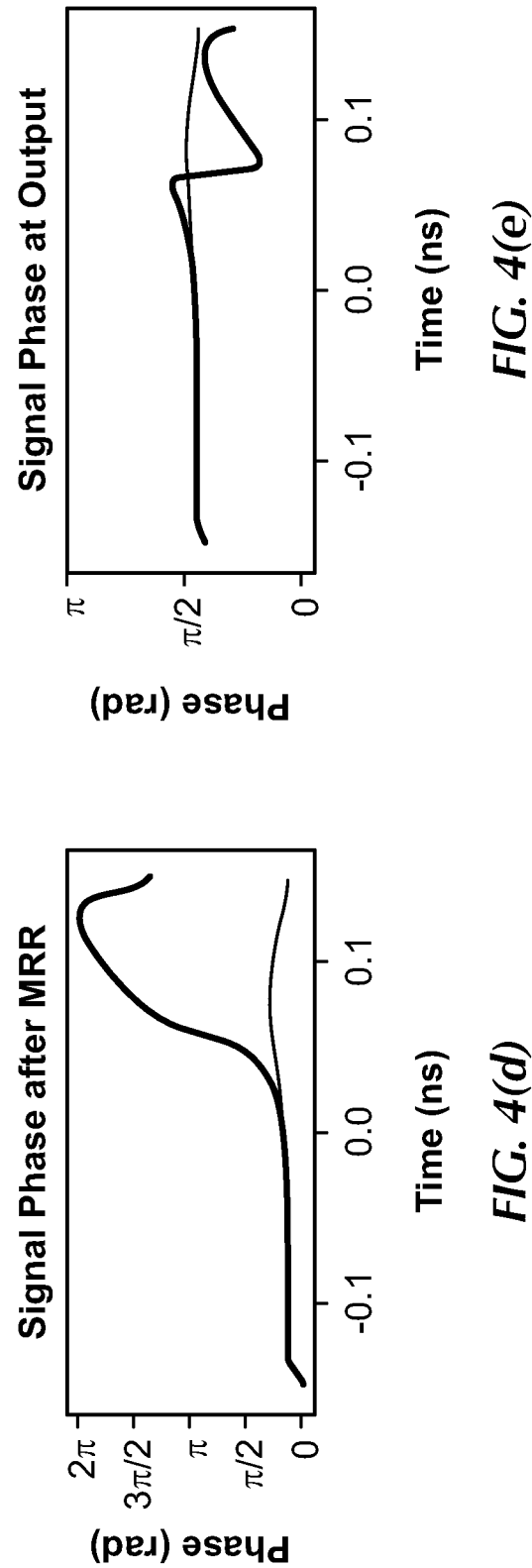
FIG. 4(b)
FIG. 4(c)
FIG. 4(d)
FIG. 4(e)

SYSTEM AND METHOD FOR PROGRAMMABLE NONLINEAR SILICON PHOTONIC CIRCUIT

CROSS-REFERENCE TO RELATED APPLICATIONS

This application claims priority to provisional application 62/798,704, filed Jan. 30, 2019, which is herein incorporated by reference in its entirety.

STATEMENT REGARDING FEDERALLY SPONSORED RESEARCH OR DEVELOPMENT

This invention was made with government support under Grant #N00014-18-1-2297, awarded by the Office of Naval Research. The government has certain rights in the invention.

FIELD OF THE INVENTION

The present invention relates generally to photonic circuits and, more particularly, to a dual resonator enhanced asymmetric Mach-Zehnder interferometer, a nonlinear silicon photonic device that can be programmable to achieve numerous ultrafast functionalities in different communication systems.

BACKGROUND OF THE INVENTION

The development of the silicon-on-insulator (SOI) platforms offers the possibility to integrate optical circuits on a silicon chip. The high refractive index of silicon enables efficient nonlinear light-matter interaction within a short waveguide. The optical nonlinearity can be further enhanced by cavity structures such as microring resonators (MRRs) and photonic crystal nanocavities by increasing instantaneous optical power through coherent power buildup. Silicon nonlinearities are of great interest owing to their potential applications. By exploiting the silicon nonlinearity, various all-optical functionalities have been realized. The key operation mechanism behind those all-optical functionalities is the power-dependent shift in the resonant spectrum. Therefore, engineering the spectral shape (e.g. on-off contrast and resonance slope) have been extensively studied for the sake of optimizing the performance of all-optical functionalities.

Simple optical circuits configured with a single cavity have a Lorentzian line shape. The gradual change in the tail of a Lorentzian spectrum makes it difficult for the single cavity device to achieve large on-off contrast, which, in turn, limits the system performances of those all-optical functionalities (e.g. switching power and contrast). As opposed to a single cavity, photonic circuits with multiple coupled cavities exhibits certain line shapes. A universal effect of multicavity coupling is Fano resonance, which originates from the interference between a resonance pathway and a coherent background pathway. The major interest in studying a connected optical cavity is it exhibits an abrupt change in transmission that can be exploited for applications requiring high switching sensitivities. A flourishing research in this is motivated by the superior optical properties of connected optical cavities. Various connected cavity configurations have been widely investigated both theoretically and experimentally. Different all-optical functionalities have also been demonstrated experimentally.

A desirable feature in such coupled resonant systems is the ability to precisely control and reconfigure its spectral shape. The key mechanism in controlling the spectral shape is to control the interference (or coupling) conditions between the cavities. It was demonstrated that photonic crystal cavities allow the control of the Fano spectrum by engineering the nano structures in photonic crystal. Such control relies on changing the cavity design and its performance is vulnerable to fabrication variances. It is more desirable that the same system can provide both symmetric and asymmetric spectral shape with different on-off contrast and slope.

In particular, thresholders are at the heart of analog-to-digital converters, comparators, and operational amplifiers. Thresholders that are based on simple, effective, and integrable all-optical components can have operating speeds well beyond the limit of their electronic counterparts. Therefore, all-optical thresholders have found their unique and indispensable role in a variety of applications which require fast signal processing. Examples include but are not limited to neuromorphic photonics, optical code division multiple access (OCDMA), optical logic gate, optical signal regeneration, and physical layer security. In these applications, all-optical thresholders play a crucial role in effectively enhancing the signal contrast. A poor signal contrast will lead to degradation of the system quality and result in a large bit error rate (BER). An all-optical thresholder can be used to improve the system performance. Substantial efforts have been made to develop high-performance optical thresholders by exploring different nonlinear effects and materials. However, most of these systems are constructed with bulky and discrete photonic devices. As such, there is a need for an all-optical thresholder that addresses the above deficiencies.

SUMMARY OF THE INVENTION

According to various embodiments, an all-optical thresholder device is disclosed. The all-optical thresholder device includes a Mach-Zehnder interferometer (MZI) coupled to a Mach-Zehnder coupler (MZC). The MZI includes at least one microring resonator (MRR) and a first tunable element, where the MRR further includes a second tunable element. The MZC includes a third tunable element. The first, second, and third tunable elements are configured to control biases of the all-optical thresholder device to achieve a desired power transfer function.

According to various embodiments, an all-optical device is disclosed. The all-optical device includes a Mach-Zehnder interferometer (MZI) coupled to a Mach-Zehnder coupler (MZC). The MZI includes at least one microring resonator (MRR) and a first tunable element, were the MRR further includes a second tunable element. The MZC includes a third tunable element. The first, second, and third tunable elements are configured to control biases of the all-optical device to achieve a desired power transfer function.

According to various embodiments, a method for operating an all-optical device including a Mach-Zehnder interferometer (MZI) coupled to a Mach-Zehnder coupler (MZC), the MZI including a first tunable element and at least one microring resonator (MRR) having a second tunable element, the MZC having a third tunable element, is disclosed. The method includes controlling the first tunable element to adjust a bias of the MZI to introduce a desired phase difference, controlling the second tunable element to adjust a bias of the MRR such that the all-optical device is functioning at about a resonance wavelength, and controlling the third tunable element to adjust a bias of the MZC to balance amplitudes of two arms of the MZI. The biases of the MZI, MRR, and MZC are controlled to achieve a desired power transfer function.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 4(b) depicts a graph of input signal waveforms with two different peak powers according to an embodiment of the present invention;

FIG. 4(c) depicts a graph of output signal waveforms with two different peak powers according to an embodiment of the present invention;

FIG. 4(d) depicts a graph of signal phase evolution according to an embodiment of the present invention;

FIG. 4(e) depicts a graph of signal phase at thresholder output according to an embodiment of the present invention;

DETAILED DESCRIPTION OF THE INVENTION

According to various embodiments, disclosed herein is an all-optical programmable thresholder on a silicon photonic circuit. By exploiting the nonlinearities in a resonator-assisted Mach-Zehnder interferometer (MZI), the disclosed optical thresholder can discriminate two optical signals with a power contract ratio as low as about 1.13. A signal contrast enhancement of 40 is experimentally achieved, which leads to a bit error rate (BER) improvement by 5 orders of magnitude and a receiver sensitivity improvement of 11 dB. The thresholding function of the device is disclosed herein and the function is validated with experimental data.

Generally disclosed herein is an all-optical thresholder based on resonator-assisted Mach-Zehnder interferometer (MZI) on a silicon-on-insulator (SOI) platform. In addition to signal contrast enhancement, the operation principle of the device is disclosed using an experimentally-validated theoretical model. Using this model, the thresholding function and the processing speed of the device is also characterized. The disclosed thresholder combines of the power-dependent nonlinear phase in the MRR and the high extinction ratio of the MZI, leading to a highly sensitive thresholder with a sharp power transfer slope of 44. With the disclosed thresholder, it is experimentally demonstrated that two optical signals with very close power levels can be well distinguished, leading to a 40× signal contrast improvement. This consequently leads to a BER improvement by 5 orders of magnitude and a receiver sensitivity improvement of 11 dB. The development of the SOI platforms offers the possibility to integrate optical thresholders on a silicon chip. The high refractive index of silicon enables efficient nonlinear interaction of lights within a short waveguide. Moreover, the nonlinearity of silicon can be further enhanced by cavity structures such as microring resonators (MRRs).

The concept behind the proposed optical thresholder is to exploit the power-dependent phase shift induced by the nonlinearity in a silicon waveguide. In a silicon waveguide, both the Kerr effect and the free carrier dispersion (FCD) can induce a power-dependent phase shift on traveling lights with fast dynamics. It is found that FCD practically dominates over Kerr in the MRR. Therefore, in the disclosed device, FCD is the dominating mechanism that contributes to the nonlinear phase.

Figure 1A:
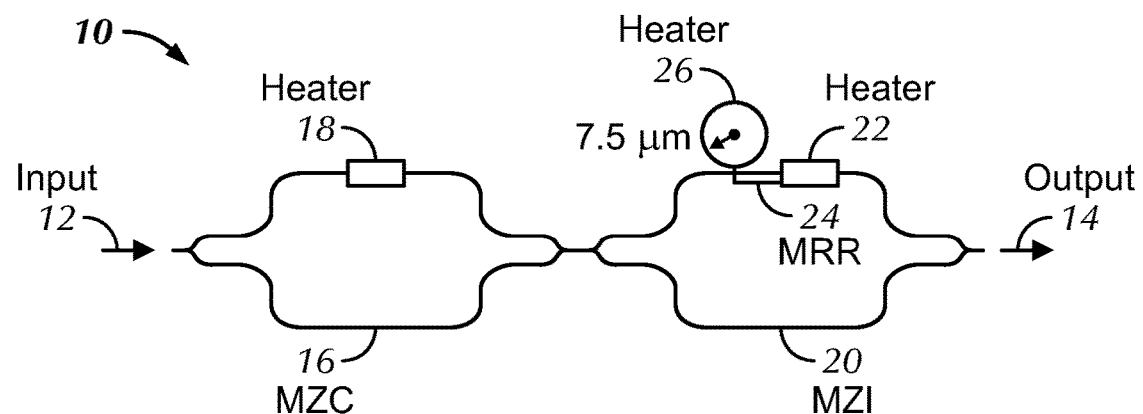
FIG. 1(a) depicts a schematic diagram of an all-optical thresholder according to an embodiment of the present invention.

FIG. 1(a) depicts a schematic diagram of an all-optical thresholder device 10. The device includes an input 12 and an output 14. Connected to the input 12 is a Mach-Zehnder Coupler (MZC) 16 which includes a heater 18 in one of the arms. The MZC 16 is connected to a MZI 20, which includes a heater 22 and at least one MRR 24 in one of the arms of the MZI 20. A second MRR (shown in FIG. 1(b)) may be included in the other arm as well, or multiple MRRs may be included on one arm, depending on the embodiment. The MRR 24 also includes an additional heater 26. The heaters 18, 22, 26 (more specifically micro-heaters) act as tunable elements to efficiently change the biases of the device 10 which enables the device to be programmed to achieve desirable power transfer functions for different applications. The device 10 can achieve these functions with high accuracy because these tunable elements can be precisely controlled by an automated control system. Alternative mechanisms for achieving tunable elements include but are not limited to electro-optical effects, such as carrier injection, or micro-electro-mechanical systems (MEMS), where the waveguides or microrings move in space, that can adjust current or voltage rather than temperature to adjust the biases of the device 10.

In the MRR 24, near the resonance, the signal experiences a power-dependent nonlinear phase shift that varies rapidly with its optical power. In addition, the MRR 24 can also increase the effective interaction length and instantaneous optical power through coherent power buildup, therefore reducing the required optical power supply. The MZI 20 is used to convert the phase change into an intensity change with a large extinction ratio. With a sufficiently large phase difference, the interference between the signals from the two arms of the MZI 20 can switch from constructive to destructive, leading to self-switching. Therefore, the MRR 24 is loaded in one arm of the MZI 20, resulting in an all-optical thresholder device 10 based on an MRR-assisted MZI.

To maximize the thresholding effect, it is critical to switch off the low power signal through destructive interference. Perfect destructive interference requires the signals traveling in the two arms of the MZI 20 to have equal amplitudes and an exact π phase difference. Therefore, the MZC 16 precedes the MRR-assisted MZI 20 through a wideband 3 dB coupler. The bias of the MZC 16 (through the heater 18) can be adjusted to balance the amplitudes at the two arms of the MZI 20, while the MZI bias can be independently tuned to introduce a π phase difference. The bias on the MRR 24 also needs to be carefully adjusted to ensure that the thresholder 10 is working around the resonance wavelength to achieve the highest sensitivity.

Figure 1B:
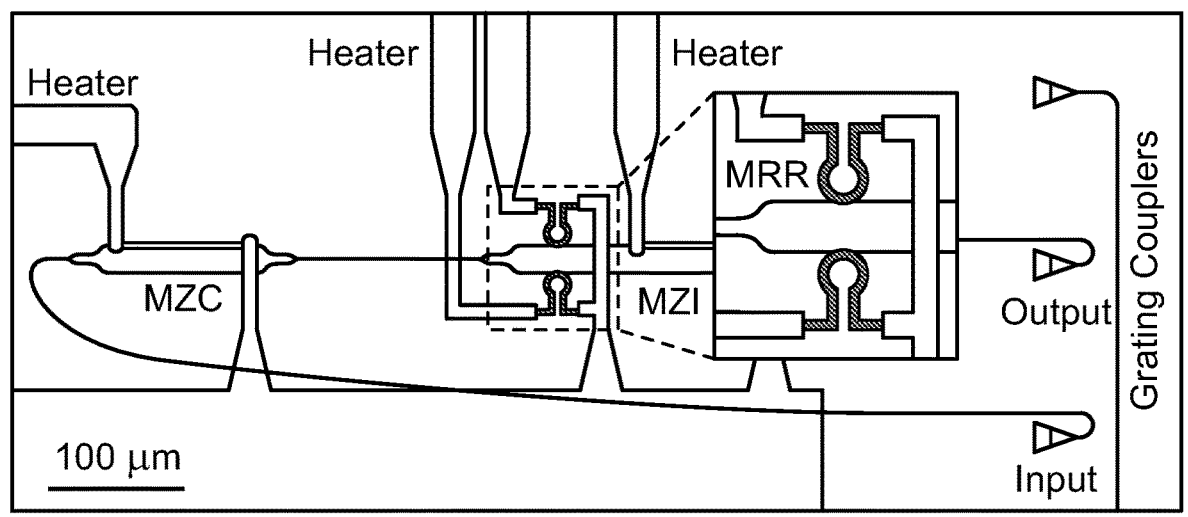
FIG. 1(b) depicts a microscope image of the all-optical thresholder according to an embodiment of the present invention.

As depicted in the microscope image in FIG. 1(b), the disclosed all-optical thresholder device 10 may include waveguides on a SOI platform. As a nonlimiting example, fully-etched, 500 nm-wide waveguides on a passive-SOI platform with a silicon thickness of 220 nm, a 3 μm oxide passivation layer, a Ti/W heating filament layer, and an Al routing layer. The MRR 24 on the arm of the MZI 20 has a radius of 7.5 μm and the coupling coefficient is about 0.6% (gap=100 nm), yielding a Q-factor of about 25000. A microheater 26 on the MRR 24 provides flexible resonance control over a full free spectral range (FSR) (18 nm). Thus, input signals of different wavelengths can be easily accommodated. Two microheaters 18 and 22 are deposited on the arms of MZC 16 and MZI 20, respectively. These tunable elements can control the interference condition of the device 10 and enable location of the sweet spot of thresholding for the signals.

Figure 1C:
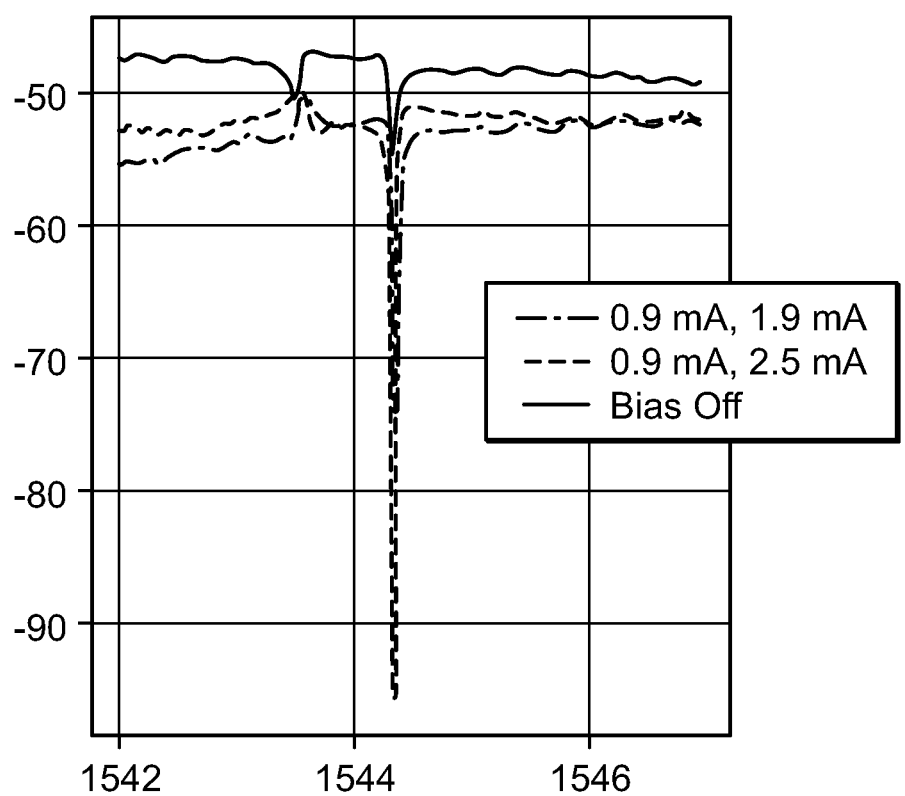
FIG. 1(c) depicts a graph of an optical spectrum of the all-optical thresholder under different biasing current according to an embodiment of the present invention.

Transmission spectra under different microheater DC current biases are shown in FIG. 1(c). When the biases are off (solid curve), the resonance features on the transmission spectrum resemble a Lorentzian-like shape with an on-off ratio of about 7.5 dB. When the bias currents are on and optimized (short dash curve), the optical power at resonance is about −90 dBm denoting an off condition. The on-off ratio in this case is found to be more than 45 dB. This result indicates that the on-off ratio of the MRR 24 can be significantly improved by loading the MRR 24 on the MZI 20. This highly sensitive transfer function can be explained by the Fano resonance effect, which results from the interference between a resonance pathway (MRR 24) and a coherent background pathway (MZI 20). The minor peak in the transmission spectra is also attributed to the Fano resonance.

Figure 2:
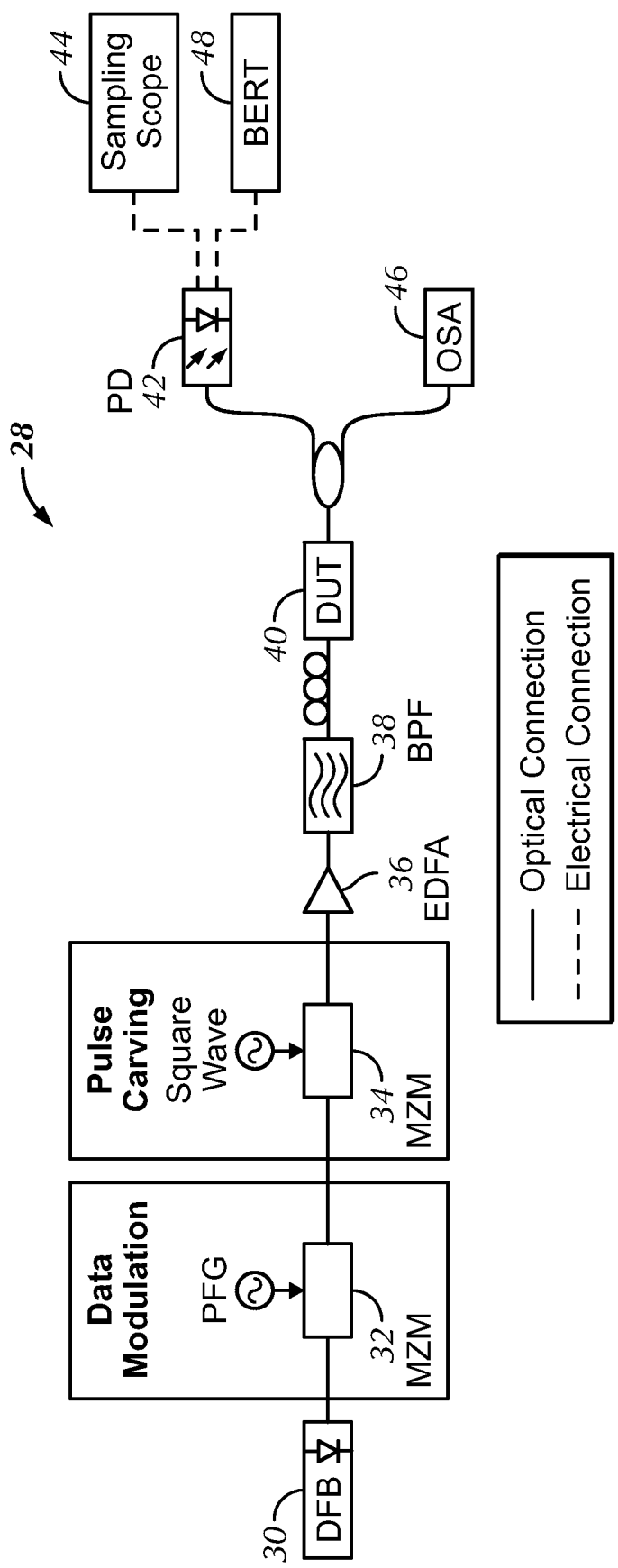
FIG. 2 depicts a diagram of an experimental setup of the all-optical thresholder according to an embodiment of the present invention.

An experimental setup 28 is shown in FIG. 2. The signal is generated by modulating an output of a distributed feedback (DFB) laser 30 using two cascaded MZMs 32, 34. The first MZM 32 is driven by electrical pulses from a pulse pattern generator (PPG). A pulsed optical signal with about 80 ps pulsewidth and equalized peak power is generated. The second MZM 34 is driven by programed patterns at a data rate of 400 Mb/s. This yields a 400 Mb/s return-to-zero (RZ) signal with two different power levels, and the contrast between two power levels can be dynamically adjusted by tuning the bias of the second MZM 34. The data speed is limited by the decay time of the TPA-induced carriers. The optical signal is amplified to 20 dBm by an erbium doped fiber amplifier (EDFA) 36 to trigger the nonlinearity in the silicon waveguide and compensate for the fiber-to-chip coupling loss. The optical signal is filtered by a band pass filter 38. The optical signal is coupled to the device 40 by free-space coupling through a sub-wavelength grating coupler with about 8 dB coupling loss. The eye diagrams of the input and output signals are obtained by photodetectors 42 and monitored using a sampling oscilloscope (OSC) 44. The signal optical spectrum is monitored using an optical spectral analyzer (OSA) 46. The microheaters are independently driven by current sources to optimize the parameters to attain a high signal contrast ratio.

Figure 3A:
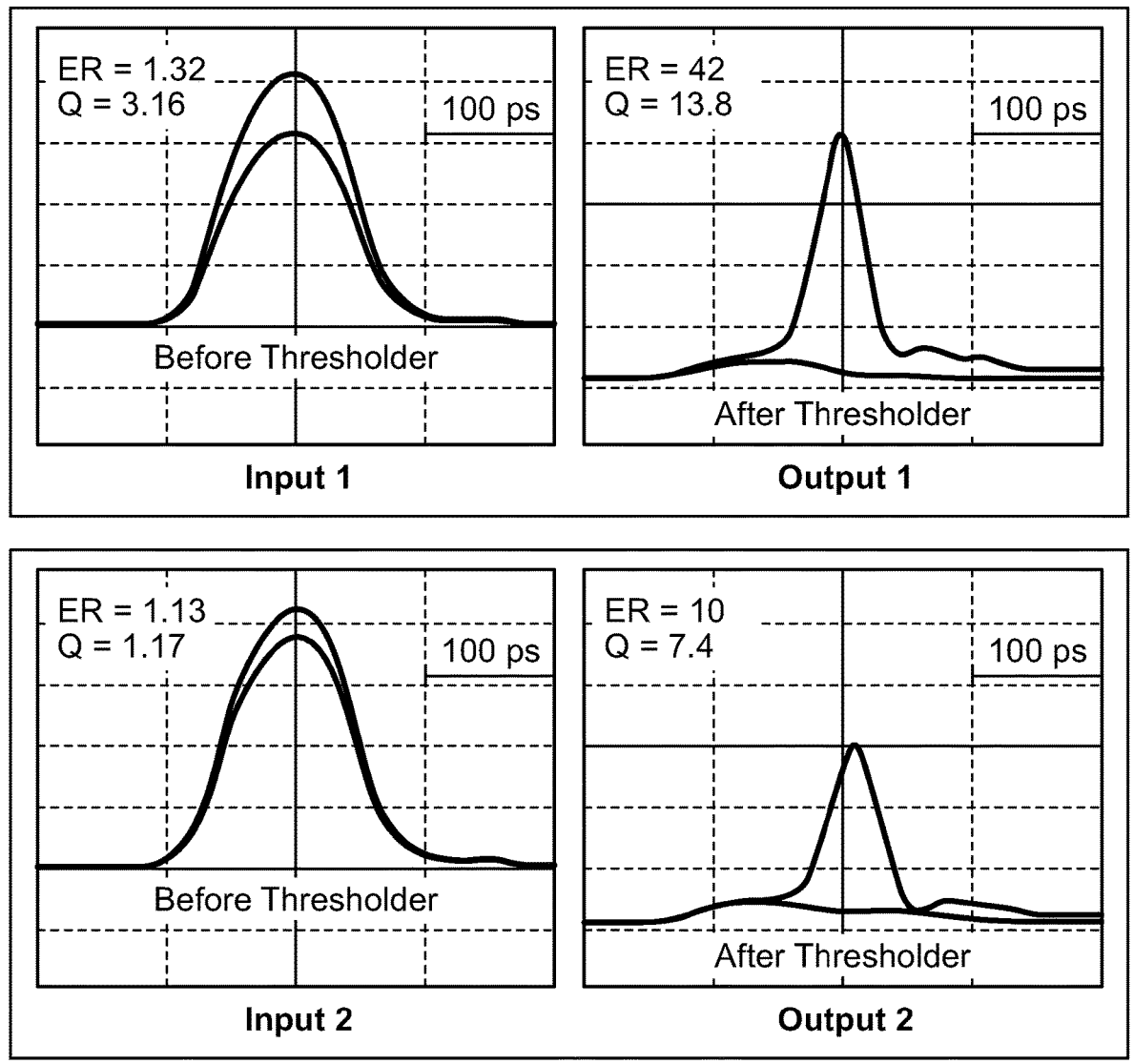
FIG. 3(a) depicts graphs of performance using two sets of signals with different input signal contrast ratios according to an embodiment of the present invention.

FIG. 3(a) shows the device performance using two sets of signals with different input signal contrast ratios. Both sets of signals have contrast ratios close to 1, resulting in significantly degraded signal quality (Q-factor) even though the received average powers (0 dBm) are much higher than the receiver sensitivity. After being processed by the thresholder, the lower power pulses in both signals are fully suppressed. As a result, the signals after thresholding have a significant signal contrast enhancement (about 40 times for signal 1, and 7.5 times for signal 2), which leads to a Q-factor improvement of 6.4 dB for signal 1 and 8 dB for signal 2. The result confirms that the disclosed thresholder 10 works well under signal contrast close to 1.

Figure 3B:
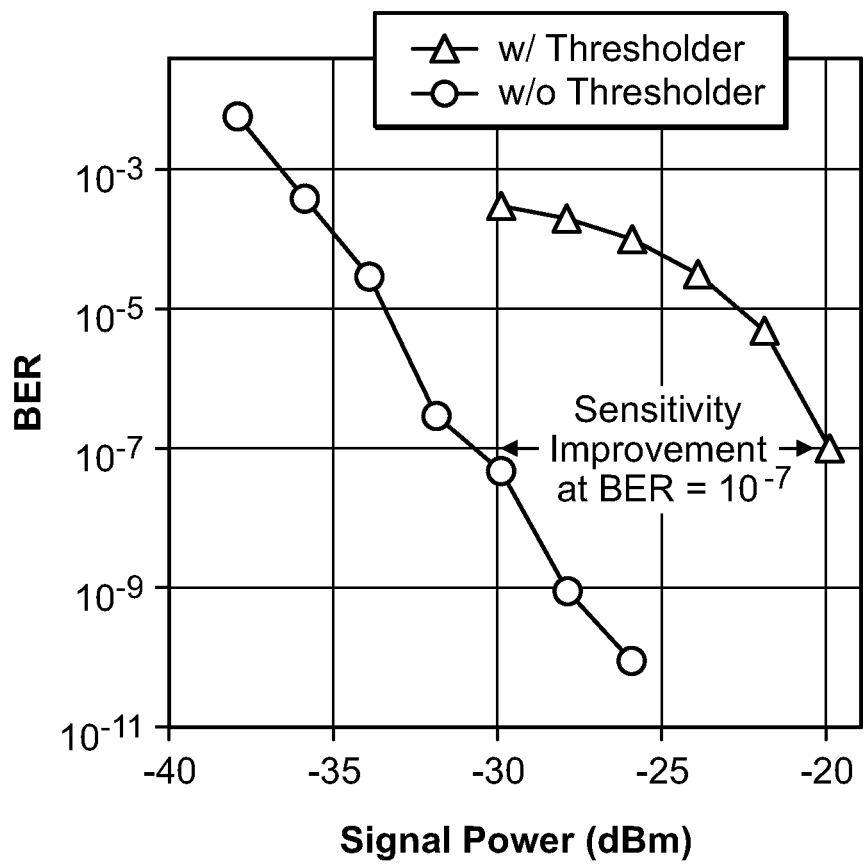
FIG. 3(b) depicts a graph of BER measurement results according to an embodiment of the present invention.

FIG. 3(b) shows the results of BER measurement of signal 2 using a BER tester (BERT) 48. Assisted with the all-optical thresholder 10, the communication link can achieve an error-free detection (BER=$10^{-9}$) at a received signal power of −27.5 dBm due to the contrast enhancement leading to an opened eye. Without the thresholder, at the same received power, the link has a BER higher than $10^{-4}$. The presence of this thresholder 10 can also effectively improve the receiver sensitivity by 11 dB at a BER of $10^{-7}$. The BER performance of the two systems are compared at same received power. The thresholder 10 induces an insertion loss of 8 dB because the operating wavelength is close to the MRR resonance. In considering loss of the thresholder, the receiver sensitivity improvement is 3 dB. However, it should be pointed out that the BER performance of low-contrast signals cannot be continuously improved by simply feeding a higher power to the photodetector 42. The reason is that the photodetector 42 has a saturation input power. Beyond the saturation, the signal contrast will degrade after detection and the eye diagram can be totally closed. By contrast, the optical thresholder 10 can remove the residual 0-level signal, thereby allowing amplification without reaching photodetector saturation. The system performance is evaluated with high signal to noise ratio (SNR). For the low SNR signal, the noise on the 0-level can be suppressed due to the destructive interference while the noise on the 1-level will be amplified. In this case, appropriate biases need to be carefully chosen to minimize the BER.

To correctly model the thresholding behavior of the device 10, nonlinearities in the silicon waveguide including the Kerr effect, two-photon absorption (TPA), TPA induced free-carrier absorption (FCA) and free-carrier dispersion (FCD) are taken into consideration. Thermal-optic effect is excluded due to its long response time compared to the signal speed. In a simulation model, the MZC 16 and MZI 20 are treated as linear waveguides due to their short lengths. Nonlinear coupled-mode theory is used to study the change in the signal complex amplitude and carrier density in the MRR 24. The evolution of the normalized complex amplitude a, and the normalized carrier density n is governed by:

$$\partial a/\partial t = i(\delta\omega - n_{Kerr}|a|^2 + \sigma_{fcd}\alpha_{tpa}n)a + (1 + \alpha_{tpa}|a|^2 + \gamma_{fca}\alpha_{tpa}n)a + \sqrt{\gamma_p P_{in}(t)} \quad (1a)$$

$$\partial n/\partial t = |a|^4 - n/\tau \quad (1b)$$

where $\delta\omega$ is the frequency detuning between the light source and the MRR resonance; t is the time variable normalized with $\Gamma_0^{-1} = 2Q_L/\omega_0$, $Q_L$ is the total quality factor; $P_{in}$ is the power input, and $(n_{Kerr}, \alpha_{tpa}, \sigma_{fcd}, \gamma_{fca}, \gamma_p) \propto (n_2\omega_0, \beta_2, \sigma_{e,h}\omega_0, \sigma_{fca}, \Gamma_c/\Gamma_0^3)$, are the Kerr, TPA, FCD, FCA, and quality factor coefficients, respectively. These equations were simplified and renormalized so that the two-photon absorption term only appears in Equation (1a).

Figure 4A:
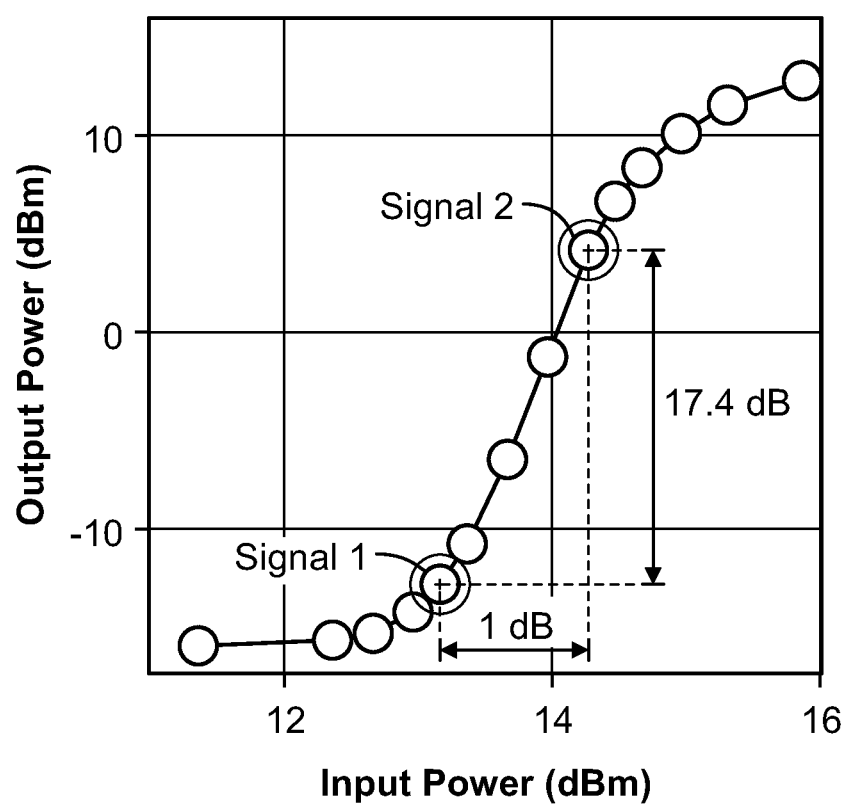
FIG. 4(a) depicts a graph of a power transfer function of the all-optical thresholder according to an embodiment of the present invention.

The input signals are Gaussian pulses with widths of 100 ps. Their wavelength is located at 150 GHz away from the MRR resonance, and the MRR Q factor is 25000. These conditions are consistent with those in the experimental measurement. The power splitting ratio on MZC 16 and the phase bias on MZI 20 are optimized such that the slope of the transfer function is maximized. The transfer function in FIG. 4(a) shows that, through the disclosed thresholder 10, a signal contrast of 1 dB (the signal contrast is numerically equal to the extinction ratio (ER) of 1.25 between the two input signals is enhanced to 17.4 dB (ER=54.9) in the output signals, resulting a 44× signal contrast enhancement. FIG. 4(b) plots the two input pulses and FIG. 4(c) plots the two output pulses. FIG. 4(d) shows the nonlinearity-induced intensity dependent phase change in the MRR 24 (derived from Equation 1), which renders an amplitude shift in the MZI output 14. Along with this phase change, the biases can be optimized applied to the MZC 16 and MZI 20 to maximize the ratio of the peak powers between two output signals. This can be accomplished when the phase difference of the 1-level signal and 0-level signal is approximately $\pi$, and a destructive interference occurs on the 0-level signal while a constructive interference occurs on the 1-level signal. As a result, the output pulses (shown in FIG. 4(d)) with significantly improved signal contrast are obtained. The output pulse width is determined by the time duration that the signal phase changes from 0 to $2\pi$, which is governed by the nonlinearity in the silicon waveguide. As a result, the output pulse duration has changed after the thresholder 10. The simulated contrast enhancement and the output pulse width (50 ps) match well with the experimental data. FIG. 4(e) shows the signal phase after the thresholder 10. Due to the power-dependent nonlinear phase, the output signal experiences a phase distortion. Such a phase distortion can be harmful if the output signal is to be transmitted through an optical fiber with non-negligible dispersion. Therefore, the thresholder 10 should be operated at the receiver end if it is used to process the signals in the fiber communication systems. However, apart from fiber communication, the disclosed thresholder 10 can be applied to other applications such as but not limited to spiking neural networks, chip interconnect, and quantum computing in which the dispersion is negligible.

Although FCD plays a dominant role in discriminating the signals, its long lifetime hinders fast nonlinear signal processing (>10 GHz) in silicon. Therefore, the processing speed of the current device is limited to 400 Mbit/s. A widely applied technique to overcome the speed limitation is by active carrier removal, i.e., reverse-biasing a p-i-n junction transversal to the silicon waveguide to reduce the lifetime of free carriers. The carrier lifetime can be effectively reduced by increasing the reverse-biasing voltage.

Figure 5:
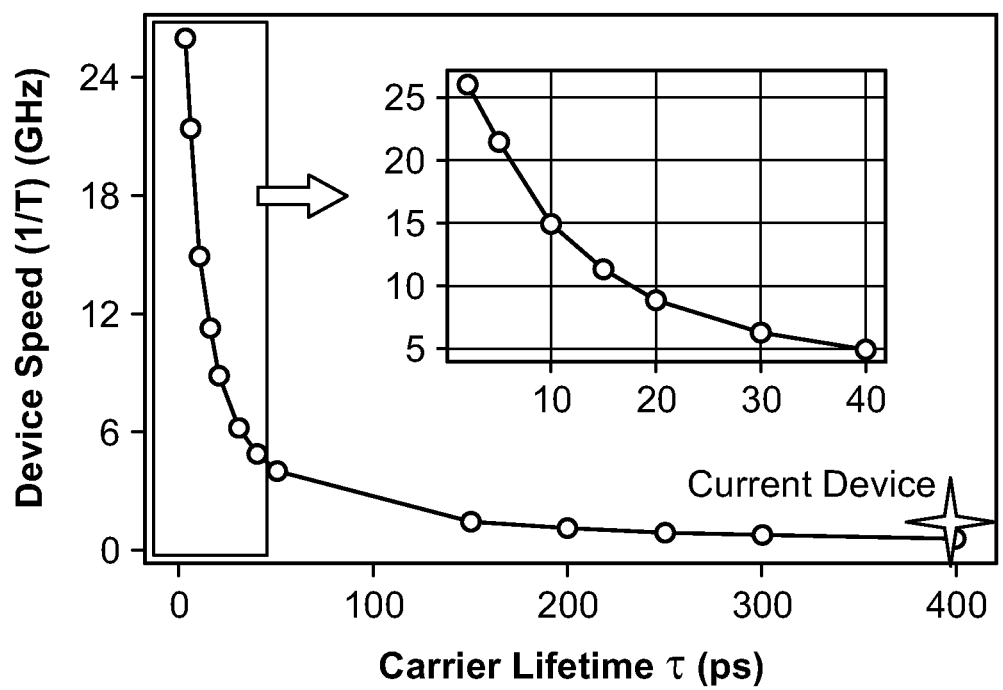
FIG. 5 depicts a graph of device speed as a function of carrier lifetime with a zoomed in view of the starred region according to an embodiment of the present invention.

Here, the device speed with active carrier removal is studied and the device speed under different carrier lifetime is characterized using the simulation model described in Equation 1. In device speed characterization, the input signal is an impulse with a pulsewidth <1 ps. The device speed is defined as 1/T, where T is the time that takes to reduce the free carrier number by 99% compared to the peak carrier number. It is worth noting that the definition of T here takes the cavity effect of MRR into consideration, and thus is not equivalent to the carrier lifetime. FIG. 5 shows the device speed as a function of the carrier lifetime. As expected, reducing the carrier lifetime can increase the device speed. With reduced lifetime, the similar thresholding function can still be achieved at the cost of requiring a higher signal power. The disclosed device 10 can operate at a speed of 400 Mbit/s and is marked in FIG. 5. The inset of FIG. 5 is a zoom-in view when the carrier lifetime is smaller than 40 ps. As shown in the inset, the disclosed thresholder 10 has the potential of working beyond 10 GHz when the carrier lifetime is reduced to about 18 ps.

The processing speed limitation imposed by carrier effects can be further relaxed by designing the MRR 24 with a lower Q factor. Other alternative approaches include the use of a silicon-organic hybrid waveguide and other TPA-free nonlinear materials. All these methods are compatible with the design of our disclosed thresholder 10.

Another application of the device 10 aside from all-optical thresholding is all-optical pulse carving, a pulse processing technique that converts long-pulse signals to short-pulse signals. Pulse carving has important applications in digital communications and computing. In communication systems, generation of short pulses has the benefit of improving the receiver sensitivity, reducing the inter-symbol interference and reducing the receiver synchronization complexity. In computing systems, the carved pulses have reduced power consumption, and therefore are essential to the systems that require low energy-dissipation for signaling. Moreover, the asynchronous pulse carving scheme also offers potential applications in analog signal processing, such as edge detection for image processing.

Prior pulse carving techniques have used a modulator driven by a clock synchronized with the incoming signal. On-chip modulators and the matching drive circuits usually require sophisticated circuits and package design. By contrast, the disclosed pulse carving technique exploits the optical nonlinearity in the silicon ring resonator, allowing asynchronous pulse carving driven directly by the optical power of the input signal. This is experimentally demonstrated by generation of short pulses (about 100 ps) from long pulses (up to about 3 ns) with an error free performance.

Figure 6A:
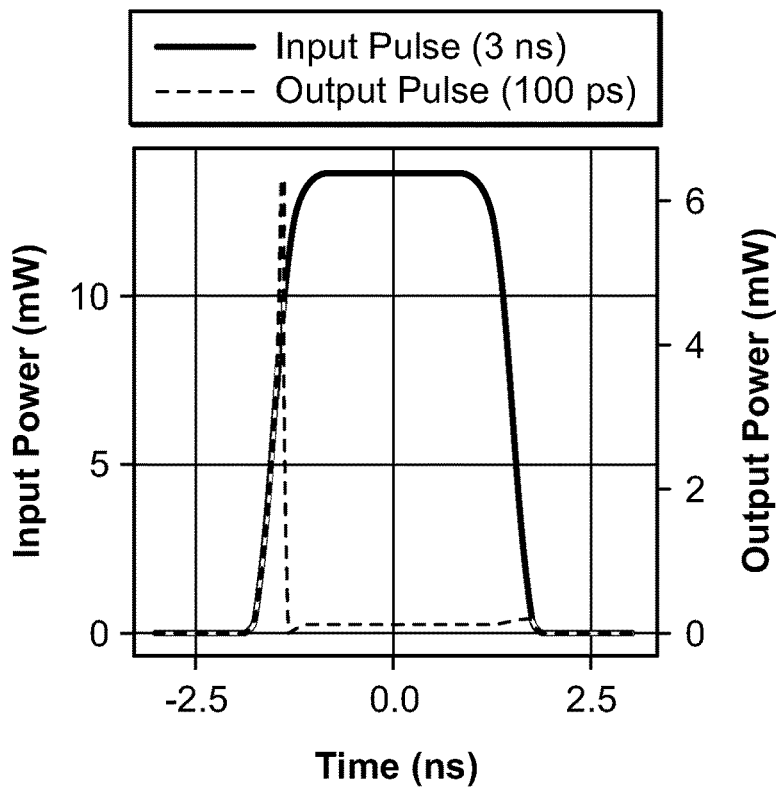
FIG. 6(a) depicts a graph showing input and output pulses according to an embodiment of the present invention.
Figure 6B:
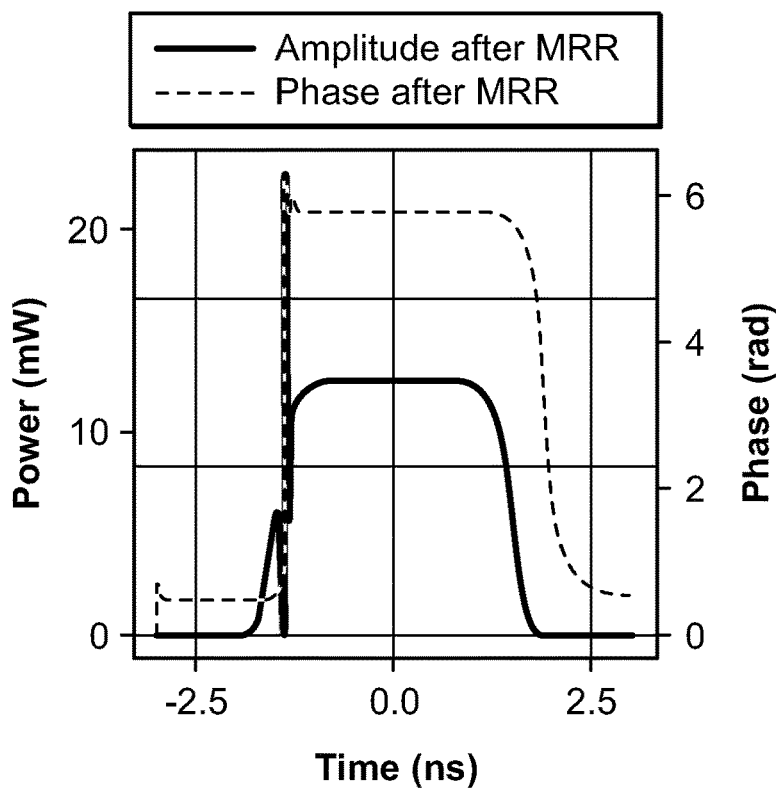
FIG. 6(b) depicts a graph showing amplitude and phase evolution according to an embodiment of the present invention.

Nonlinear CMT is used to explain the operation principle of pulse carving using the device 10. The input signal used to illustrate the device operation principle is a super Gaussian pulse with a pulsewidth of 3 ns. The signal frequency is 150 GHz away and at the blue side of the MRR resonance. These parameters are consistent with those used in the experiment but are not intended to be limiting. Equation 1 is used to compute the amplitude and phase evolution after the signal propagates through the MRR 24, and the results are shown in FIG. 6(b). When the input power increases, the output power exhibits strong oscillation because the MRR resonance is shifted driven by the input optical power. As a result of power oscillation, the signal phase experiences a significant change of about $2\pi$.

Figure 6C:
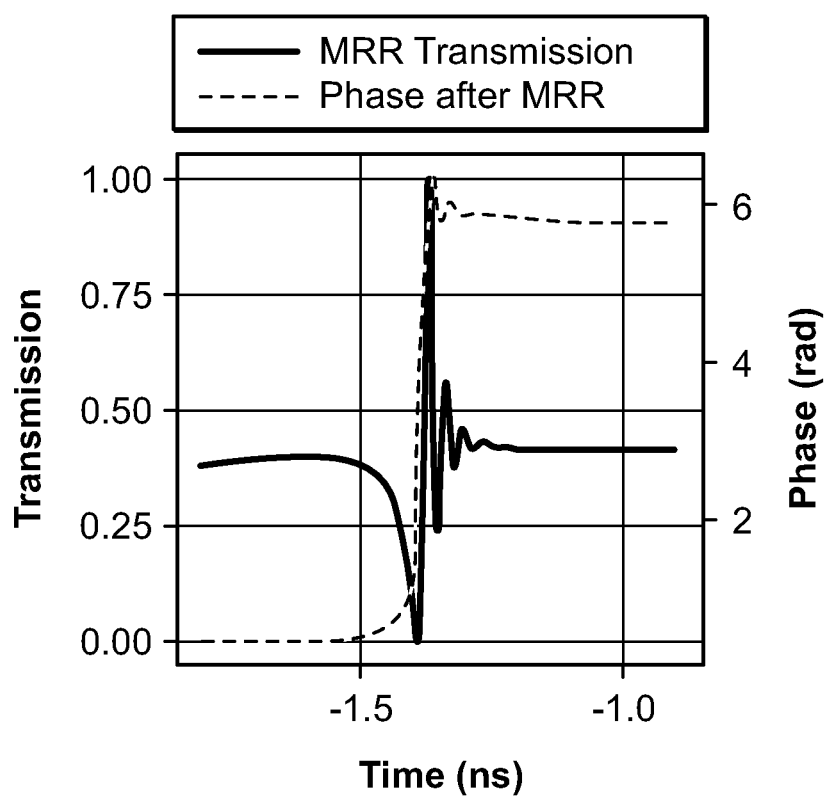
FIG. 6(c) depicts a graph showing power transmission and phase change according to an embodiment of the present invention.

To show the origins of the power and phase change, the power transmission and phase change are zoomed in near the power oscillation region and are plotted in FIG. 6(c). As the power of the input signal increases, the optical power coupled to the MRR 24 becomes high enough to generate free carriers via two-photon absorption. The free carriers change the refractive index of the ring waveguide and results in the resonance to shift to a shorter wavelength (blue shift). Since the signal is originally at the blue side of the MRR resonance, the resonance shift will bring the signal in resonance which causes the first dip in the transmission spectrum. As the signal power continues increasing, the signal gradually shifts to the red side of the resonance and the transmission increases consequently. When the signal gets out of resonance, the optical power inside the ring cavity decreases which decreases the rate of free carrier generation. As a consequence, the MRR resonance shifts back to the shorter wavelength and the transmission decreases. The interplay between the in-cavity power, and free carriers-induced MRR resonance shift lead to the oscillation of the transmission spectrum. The oscillation gradually decreases and the system reaches the steady state.

Due to the Kramer-Kronig relation, the sharp transmission changing from 0 to 1 will cause a phase change of about $2\pi$. Now, the phase biases are optimized on the MZC 16 and MZI 20, such that the signal at about −1.42 ns experiences a constructive interference. The signal phase at other times (apart from the short phase transition region) has a $\pi$ phase difference, and therefore, the signal power will be carved due to the destructive interference. By carefully choosing the biases on MZC 16 and MZI 20, the pulse width of the signal is carved to 100 ps.

To understand what determines the pulse width generated using the device 10, the relations between 1) input optical power and output pulse width and 2) input pulse width and output pulse width are investigated.

Figure 7A:
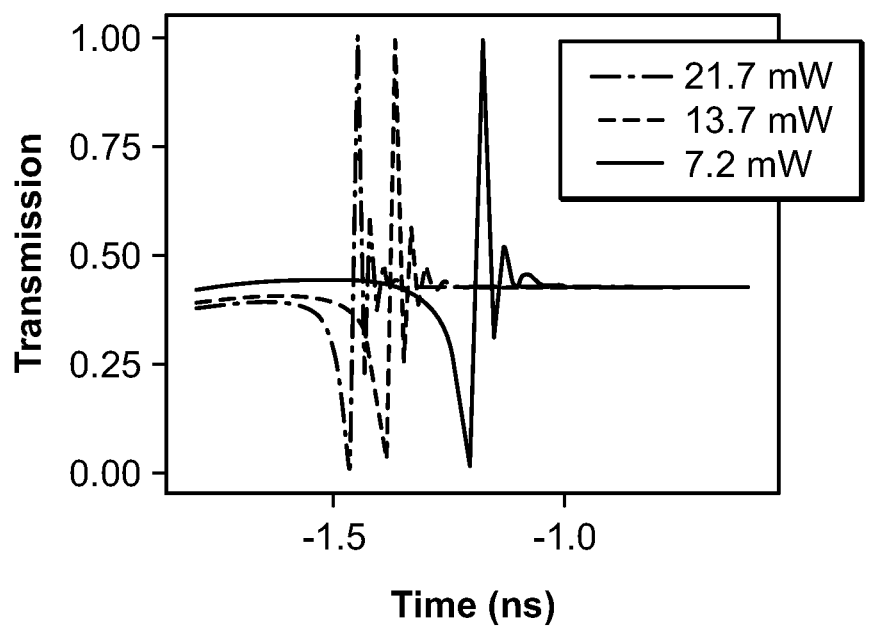
FIG. 7(a) depicts a graph comparing temporal transmission and phase according to an embodiment of the present invention.
Figure 7B:
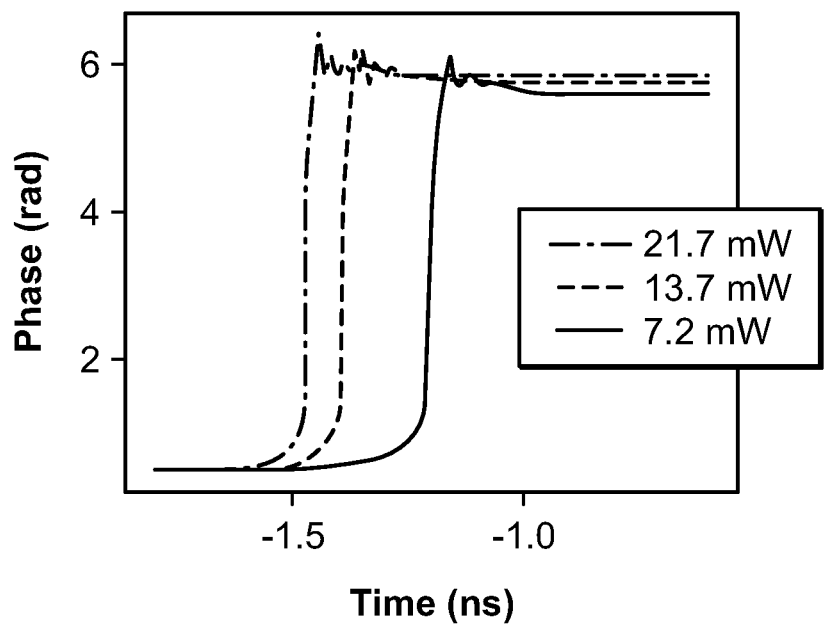
FIG. 7(b) depicts a graph comparing temporal transmission and phase according to an embodiment of the present invention.
Figure 7C:
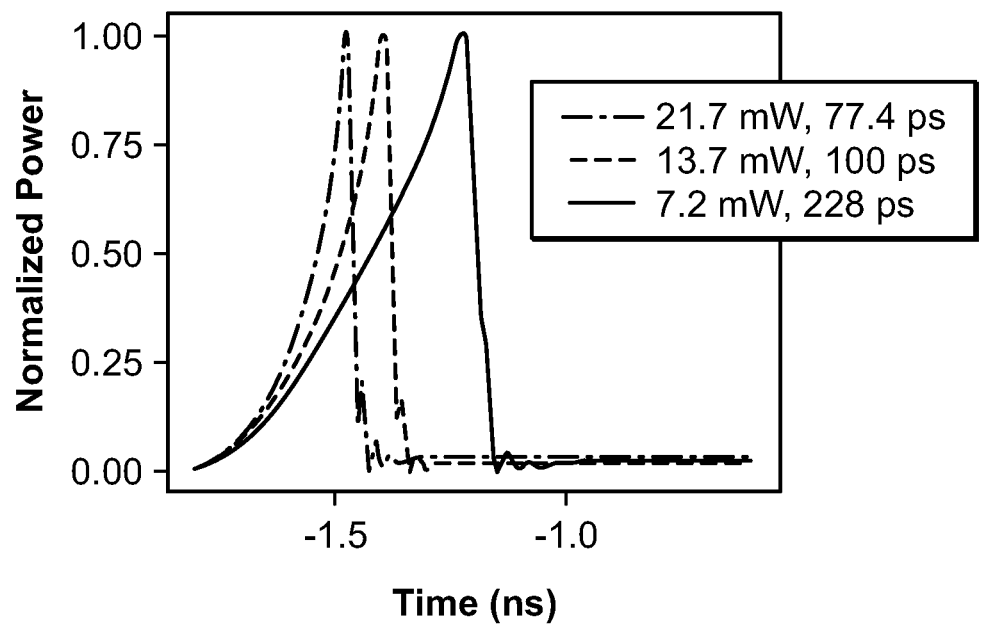
FIG. 7(c) depicts a graph showing a generated short output pulse width according to an embodiment of the present invention.
Figure 7D:
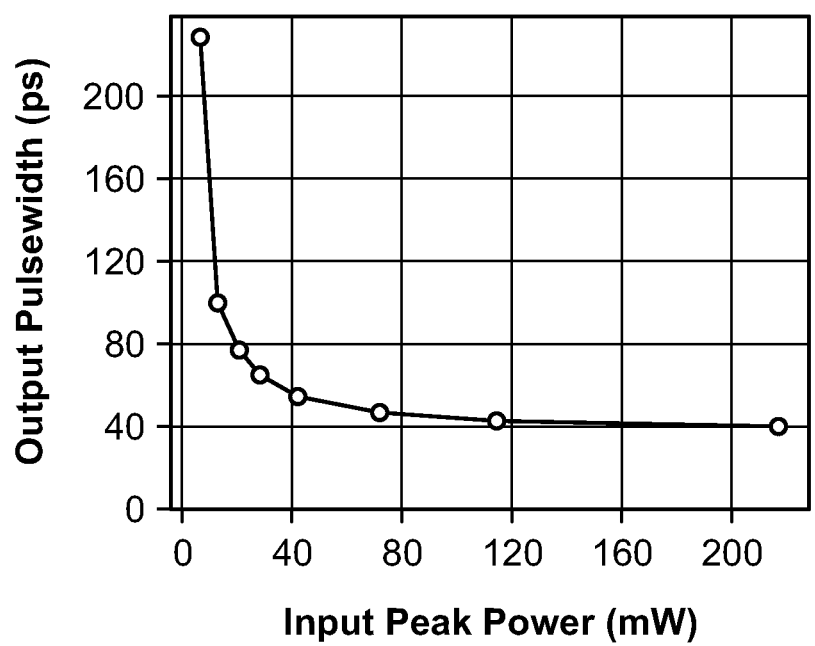
FIG. 7(d) depicts a graph showing a relation between input power and output pulse width according to an embodiment of the present invention.

To study the output pulse width under different input power, three super-Gaussian pulses with peak power of 21.7 mW, 13.7 mW and 7.2 mW are generated. The three pulses have an identical pulse shape as shown in FIG. 6(a) and have a pulse width of 3 ns. The temporal transmission and the phase (only the zoomed-in region) are compared in FIGS. 7(a) and (b), respectively. As shown in FIG. 7(a), the input pulse with higher optical power experiences the first transmission dip earlier than those with lower optical power. This is because, for the higher optical power pulses, it takes less time to accumulate sufficient energy to bring the signal into the MRR resonance. As a result, the rapid about a $2\pi$ phase shift first occurs in the pulse with highest input power. Since the portion of the $2\pi$ pulse with a phase value of around a will be carved due to destructive interference, the pulse with the highest optical power will generate a short output pulse width as shown in FIG. 7(c). As the input power increases, the output pulse peak gradually shifts towards the edge of the input pulse. At the pulse edge, the required power to further shorten the output pulse width significantly increases, and the output pulse width saturates. The relation between the input power and output pulse width is plotted in FIG. 7(d). The output pulse width decreases as the input power increases, and the pulse width saturates at 40 ps.

Figure 8A:
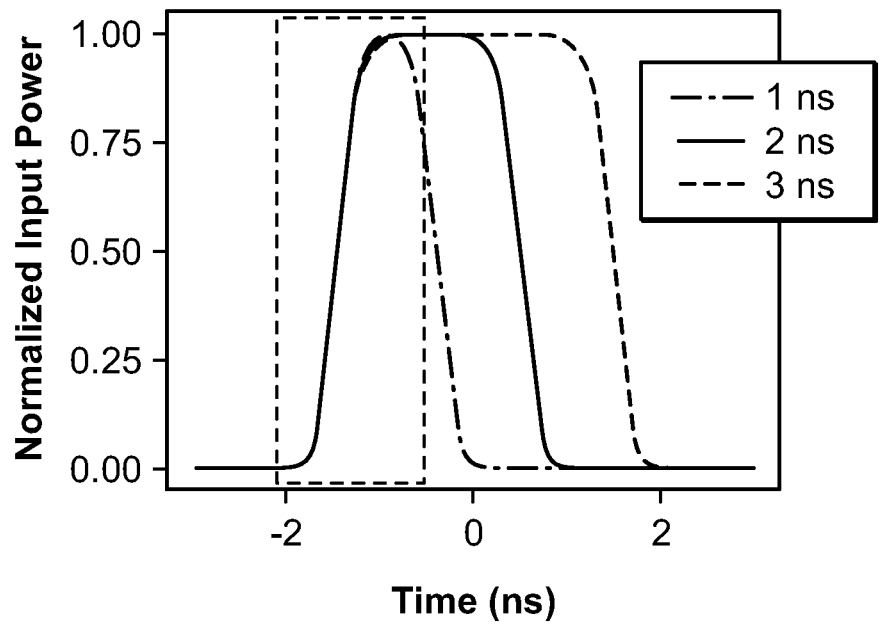
FIG. 8(a) depicts a graph of rising time and peak power according to an embodiment of the present invention.
Figure 8B:
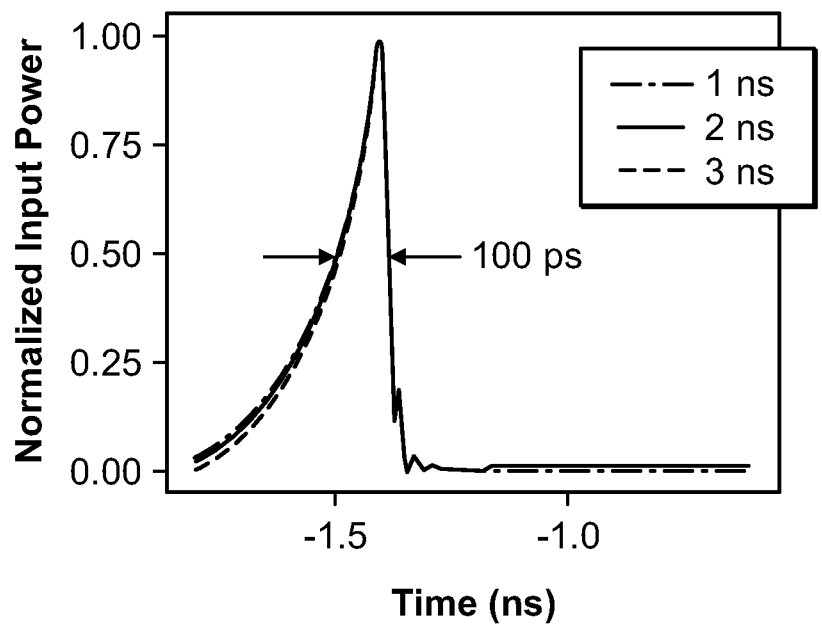
FIG. 8(b) depicts a graph showing a zoomed in region according to an embodiment of the present invention.
Figure 8C:
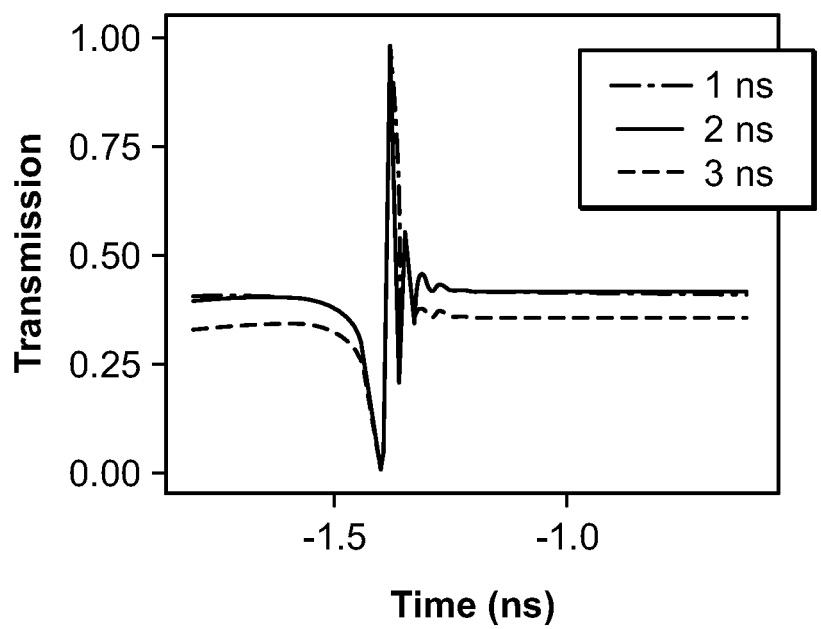
FIG. 8(c) depicts a graph showing a zoomed in region according to an embodiment of the present invention.
Figure 8D:
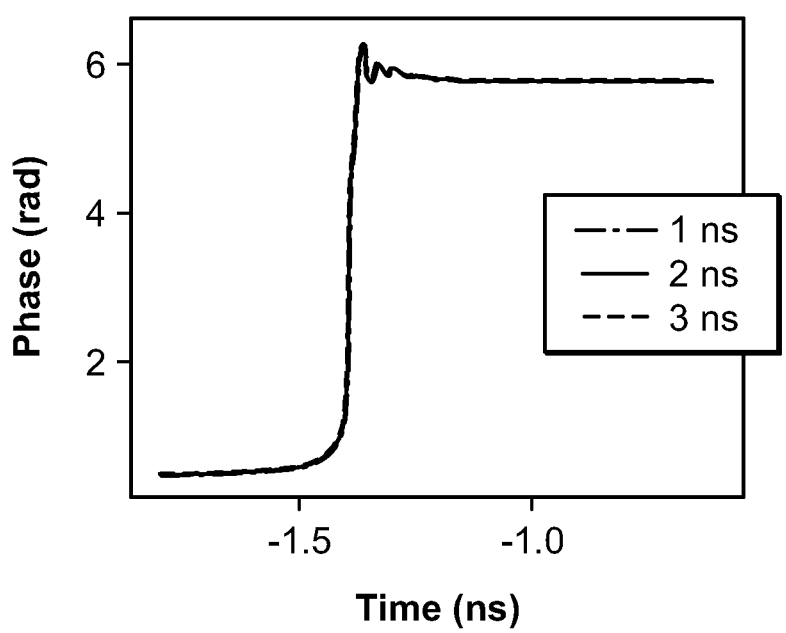
FIG. 8(d) depicts a graph showing a zoomed in region according to an embodiment of the present invention.

Now, the output pulse width under different input pulse widths are compared. Three super-Gaussian pulses are generated, and their pulse widths are 3 ns, 2 ns and 1 ns, respectively. The rising time and the peak power of the three pulses are identical. FIGS. 8(b)-(d) show the zoom-in region of the transmission and phase change where the changes are most significant (corresponding to the dashed box region in FIG. 8(a)). The transmission oscillation and the a phase shift occurs at the edge of input pulse which are identical to the three pulses, and the rest portion of the pulse is carved out, hence resulting in similar output pulse width for the three pulses. FIGS. 7(a)-(d) and 8(a)-(d) show that, with sufficient input power, the output pulse width only depends on the pulse shape and the power at the rising edge of the pulses, regardless of the input pulse width. This result suggests that the disclosed device 10 can be used as an edge detector.

Figure 9A:
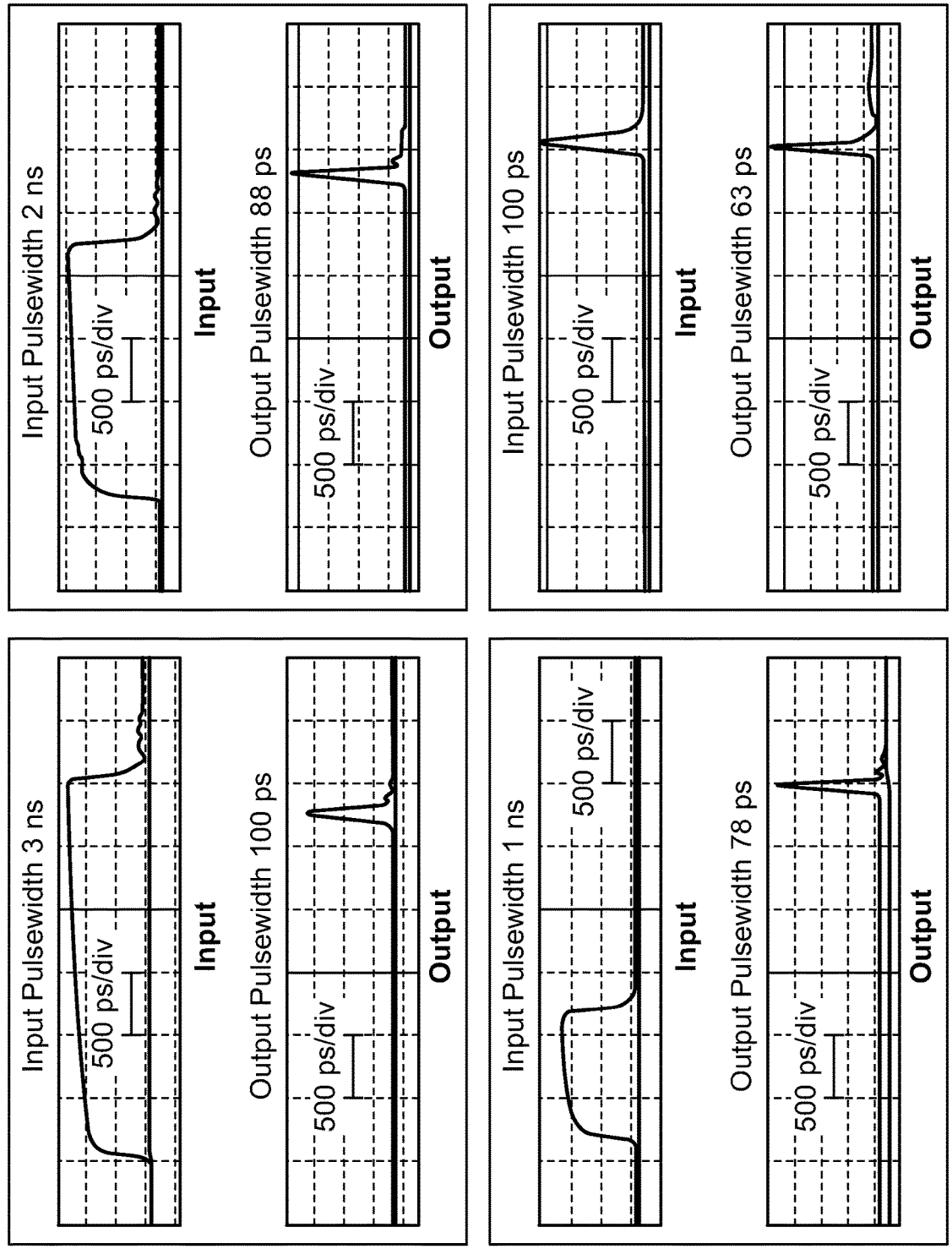
FIG. 9(a) depicts results of an experimental setup according to an embodiment of the present invention.
Figure 9B:
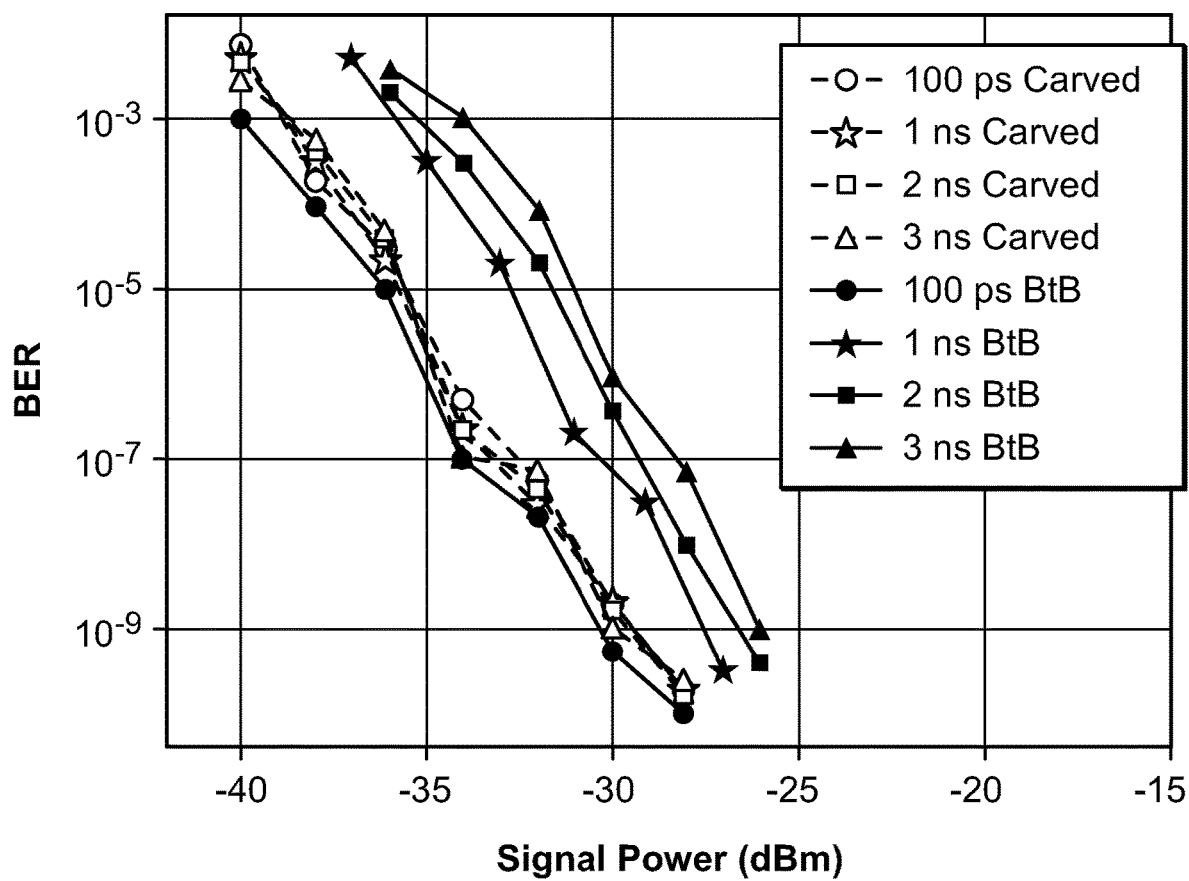
FIG. 9(b) depicts additional results of an experimental setup according to an embodiment of the present invention.

An experimental characterization is carried out, where the setup is similar to the setup as shown previously in FIG. 2. The signal is a return-to-zero (RZ) OOK signal generated by modulating a distributed feedback (DFB) laser output 30 using two cascaded MZMs 32, 34. The first MZM 32 is driven by a pseudo-random bit sequence with a length of 27-1. The second MZM 34 is driven by a square wave. Both electrical signals have a data rate of 100 Mb/s, which yields a 100 Mb/s RZ-OOK signal. The duty cycle of the square wave can be tuned to generate RZ signal with different pulse width. The optical signal is amplified to 14 dBm by an erbium doped fiber amplifier (EDFA) 36 to trigger the nonlinearity in the silicon waveguide and compensate for the fiber-to-chip coupling loss. The optical signal is coupled to the device 40 by free-space coupling through a sub-wavelength grating coupler with 8 dB coupling loss. The microheaters are independently driven by computer-controlled current sources to minimize the output pulse width. The eye diagram of the input signal tapped before the input grating coupler and the output signal is measured, and the experimental results are shown in FIGS. 9(a)-(b). The input signals shown in FIGS. 9(a)-(b) have the pulse width of 3 ns, 2 ns, 1 ns and 100 ps, respectively. The four signals have approximately identical rising time and averaging power. Therefore, the peak power of the input signal decreases with the pulse widths. Due to the difference in peak power, the output pulse widths are carved to 100 ps, 88 ps, 78 ps and 63 ps, respectively corresponding to 3 ns, 2 ns, 1 ns and 100 ps input pulse width. The output pulse shape and pulse width are consistent with the simulation results.

To evaluate the signal quality of the output signals, the bit error rate (BER) test is conducted. An error free operation is achieved for all the output signals. Comparing the back-to-back signals with 1 ns, 2 ns and 3 ns input pulsewidth and their corresponding carved signals, the carved signals provide a receiver sensitivity improvement of 2.5 dB, 3.3 dB and 3.8 dB, respectively. This is because the carved signals have significantly higher peak power compared to the back-to-back signals under the same received (average) power.

As such, generally disclosed herein is an all-optical programmable nonlinear device based on resonator-assisted nonlinearity in a Mach-Zehnder interferometer. This device can discriminate signals with extremely close power levels due to its sharp thresholding transfer function. It was experimentally demonstrated that this device enables an enhancement of 40 times in signal amplitude contrast, and consequently, an improvement of 11 dB in the receiver sensitivity. The disclosed device, developed on a CMOS-compatible silicon-on-insulator (SOI) platform, can find uses in a number of high-performance optical signal processing applications and can be monolithically integrated with other on-chip functionalities.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. An all-optical thresholder device, comprising:
   a Mach-Zehnder interferometer (MZI) coupled to a Mach-Zehnder coupler (MZC);
   the MZI comprising at least one microring resonator (MRR) and a first tunable element, the MRR further comprising a second tunable element;
   the MZC comprising a third tunable element;
   the first, second, and third tunable elements configured to control biases of the all-optical thresholder device to achieve a desired power transfer function.

2. The all-optical thresholder device of claim 1, further comprising an input coupled to the MZC and an output coupled to the MZI.

3. The all-optical thresholder device of claim 1, wherein the first, second, and third tunable elements each comprise one of a microheater, an electro-optical system, and a micro-electro-mechanical system.

4. The all-optical thresholder device of claim 1, wherein the first, second, and third tunable elements are controlled by an automated control system.

5. The all-optical thresholder device of claim 1, wherein the MRR is included in one of two arms of the MZI.

6. The all-optical thresholder device of claim 5, wherein a second MRR is included in the other of the two arms of the MZI.

7. The all-optical thresholder device of claim 1, wherein the third tunable element is configured to adjust a bias of the MZC to balance amplitudes of two arms of the MZI.

8. The all-optical thresholder device of claim 1, wherein the first tunable element is configured to adjust a bias of the MZI to introduce about a $\pi$ phase difference.

9. The all-optical thresholder device of claim 1, wherein the second tunable element is configured to adjust a bias of the MRR such that the all-optical thresholder device is functioning at about a resonance wavelength.

10. The all-optical thresholder device of claim 1, wherein the MZI and MZC are implemented on a silicon-on-insulator (SOI) platform.

11. The all-optical thresholder device of claim 1, wherein the power transfer function is determined based on one or more nonlinear effects.

12. The all-optical thresholder device of claim 11, wherein the non-linear effects comprise one or more of a Kerr effect, two-photon absorption (TPA), TPA induced free-carrier absorption (FCA), and free-carrier dispersion (FCD).

13. The all-optical thresholder device of claim 1, wherein the first, second, and third tunable elements are controlled to maximize a slope of the power transfer function.

14. An all-optical device, comprising:
    a Mach-Zehnder interferometer (MZI) coupled to a Mach-Zehnder coupler (MZC);
    the MZI comprising at least one microring resonator (MRR) and a first tunable element, the MRR further comprising a second tunable element;
    the MZC comprising a third tunable element;
    the first, second, and third tunable elements configured to control biases of the all-optical device to achieve a desired power transfer function.

15. The all-optical device of claim 14, further comprising an input coupled to the MZC and an output coupled to the MZI.

16. The all-optical device of claim 14, wherein the first, second, and third tunable elements each comprise one of a microheater, an electro-optical system, and a micro-electro-mechanical system.

17. The all-optical device of claim 14, wherein the first, second, and third tunable elements are controlled by an automated control system.

18. The all-optical device of claim 14, wherein the MRR is included in one of two arms of the MZI.

19. The all-optical device of claim 18, wherein a second MRR is included in the other of the two arms of the MZI.

20. The all-optical device of claim 14, wherein the third tunable element is configured to adjust a bias of the MZC to balance amplitudes of the two arms of the MZI.

21. The all-optical device of claim 14, wherein the first tunable element is configured to adjust a bias of the MZI to introduce a desired phase difference.

22. The all-optical device of claim 14, wherein the second tunable element is configured to adjust a bias of the MRR such that the all-optical device is functioning near a resonance wavelength.

23. The all-optical device of claim 14, wherein the MZI and MZC are implemented on a silicon-on-insulator (SOI) platform.

24. The all-optical device of claim 14, wherein the power transfer function is determined based on one or more nonlinear effects.

25. The all-optical device of claim 24, wherein the non-linear effects comprise one or more of a Kerr effect, two-photon absorption (TPA), TPA induced free-carrier absorption (FCA), and free-carrier dispersion (FCD).

26. The all-optical device of claim 14, wherein the first, second, and third tunable elements are controlled to optimize the power transfer function.

27. The all-optical device of claim 14, wherein the first, second, and third tunable elements are controlled to convert a long-pulse signal into a short-pulse signal.

28. A method for operating an all-optical device, the all-optical device including a Mach-Zehnder interferometer (MZI) coupled to a Mach-Zehnder coupler (MZC), the MZI including a first tunable element and at least one microring resonator (MRR) having a second tunable element, the MZC having a third tunable element, the method comprising:
- controlling the first tunable element to adjust a bias of the MZI to introduce a desired phase difference;
- controlling the second tunable element to adjust a bias of the MRR such that the all-optical device is functioning at about a resonance wavelength; and
- controlling the third tunable element to adjust a bias of the MZC to balance amplitudes of two arms of the MZI;
- the biases of the MZI, MRR, and MZC being controlled to achieve a desired power transfer function.

29. The method of claim 28, wherein the first, second, and third tunable elements each comprise one of a microheater, an electro-optical system, and a micro-electro-mechanical system.

30. The method of claim 28, further comprising controlling the first, second, and third tunable elements by an automated control system.

31. The method of claim 28, wherein the MZI and MZC are implemented on a silicon-on-insulator (SOI) platform.

* * * * *